(12) United States Patent
Inoue (10) Patent No.: US 7,715,284 B2
(45) Date of Patent: May 11, 2010

(54) CASSETTE LIBRARY DEVICE AND METHOD OF CONTROLLING THE ATTITUDE THEREOF

(75) Inventor: Yukihiro Inoue, Toon (JP)

(73) Assignee: Panasonic Corporation, Osaka (JP)

( * ) Notice: Subject to any disclaimer, the term of this patent is extended or adjusted under 35 U.S.C. 154(b) by 1050 days.

(21) Appl. No.: 10/546,634

(22) PCT Filed: Mar. 4, 2005

(86) PCT No.: PCT/JP2005/003749

§ 371 (c)(1),
(2), (4) Date: Aug. 24, 2005

(87) PCT Pub. No.: WO2005/086151

PCT Pub. Date: Sep. 15, 2005

(65) Prior Publication Data

US 2006/0152840 A1    Jul. 13, 2006

(30) Foreign Application Priority Data

Mar. 9, 2004    (JP) .............................. 2004-064900

(51) Int. Cl.
*G11B 21/08*    (2006.01)
(52) U.S. Cl. .................................................. 369/30.01
(58) Field of Classification Search .................. None
See application file for complete search history.

(56) References Cited

U.S. PATENT DOCUMENTS

| | | | |
|---|---|---|---|
| 5,274,516 A * | 12/1993 | Kakuta et al. ............... | 360/92.1 |
| 6,104,693 A | 8/2000 | Coffin et al. ................ | 369/178 |
| 6,266,316 B1 | 7/2001 | Luffel et al. | |
| 6,404,724 B2 | 6/2002 | Luffel et al. ................ | 369/178 |
| 2003/0039051 A1 * | 2/2003 | Taki et al. ..................... | 360/69 |
| 2006/0126209 A1 * | 6/2006 | Starr et al. .................... | 360/55 |
| 2008/0239561 A1 * | 10/2008 | Ikeuchi et al. .............. | 360/92.1 |

FOREIGN PATENT DOCUMENTS

| | | |
|---|---|---|
| EP | 0 500 384 A2 | 8/1992 |
| JP | 57-015466 | 6/1955 |
| JP | 05-036178 | 2/1993 |
| JP | 05-128674 | 5/1993 |
| JP | 7-326108 | 12/1995 |
| JP | 08-329640 | 12/1996 |

(Continued)

OTHER PUBLICATIONS

"DDS-built-in Backup Library", New Technology of Matsushita Electric Technology Industrial Co., Ltd. 2002, May 2003, pp. 155-156 (w/translation of relevant paragraphs).

*Primary Examiner*—Joseph H Feild
*Assistant Examiner*—Henok G Heyi
(74) *Attorney, Agent, or Firm*—Steptoe & Johnson LLP (57) ABSTRACT

A cassette library apparatus and a posture control method thereof are provided. A swing arm (16*a*) is capable of chucking or releasing a cassette (1) by getting into a recessed part (10*a*) of the cassette (1) and getting out of the recessed part (10*a*) when a swing frame (34) swings up and down. The apparatus includes a swing mechanism (47, 48) for swinging the swing frame (34) and the swing arm (16*a*), a stepping motor (45) for driving the swing mechanism (47, 48), a device (51, 52) which detects the swing arm (16*a*) being in a specific posture, and a device (55) which detects the posture of the swing arm (16) by counting a number of pulses supplied to the stepping motor (45) when the posture of the swing arm (16*a*) is changed from the specific posture by drive of the stepping motor (45).

6 Claims, 13 Drawing Sheets

FOREIGN PATENT DOCUMENTS

| | | |
|---|---|---|
| JP | 08-329641 | 12/1996 |
| JP | 09-171653 | 6/1997 |
| JP | 09-237457 | 9/1997 |
| JP | 2000-251373 | 9/2000 |

* cited by examiner

PRIOR ART

F I G. 1 2

PRIOR ART

PRIOR ART

FIG. 15

PRIOR ART

CASSETTE LIBRARY DEVICE AND METHOD OF CONTROLLING THE ATTITUDE THEREOF

The present application is based on International Application PCT/JP2005/003749, filed Mar. 4, 2005, which application is incorporated herein by reference in its entirety.

TECHNICAL FIELD

The present invention relates to a cassette library apparatus and a posture control method thereof, and more particularly to a cassette library apparatus, which draws out a cassette such as a tape cassette housed in a garage by a picker of a turn table structure, and transfers the cassette to a driver for performing recording and reproduction for a medium in the cassette, and a posture control method thereof.

BACKGROUND ART

Figure 11:
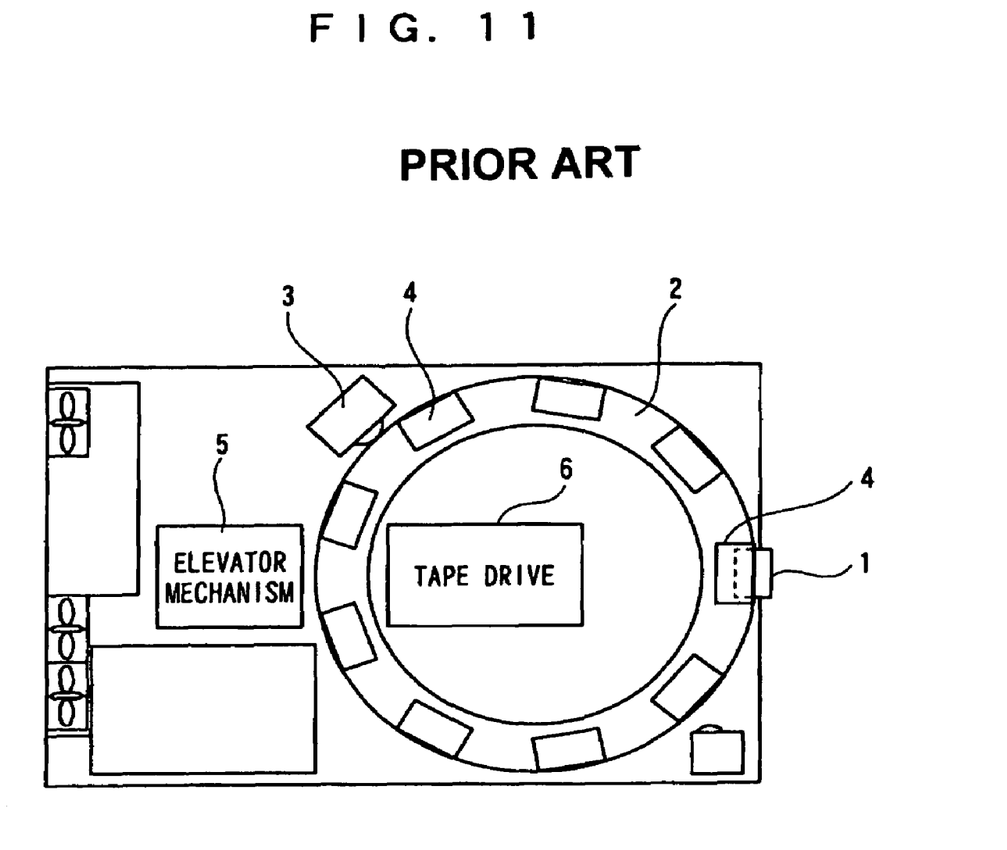
FIG. 11 is a schematic view of a known cassette library apparatus.

As a cassette library apparatus of this kind, as shown in FIG. 11, the one in which a plurality of garages 4 are disposed in an annular form on a turn table 2 and a tape cassette 1 is housed in each of the garages 4 is known. In this apparatus, the turn table 2 is rotated by a drive mechanism 3, and thereby, the garage 4 housing the targeted cassette 1 is opposed to an elevator mechanism 5. This elevator mechanism 5 takes out the targeted tape cassette 1 out of the garage 4 and loads and unloads the targeted tape cassette 1 into and from the tape drive 6, whereby readout and write of information are carried out ("New Technology of Matsushita Electric 2002" 2003/05, pages 155 to 159 "DDS loaded backup library" issued by R&D Planning Office, Matsushita Electric Industrial Co., Ltd.).

In this construction, loading and unloading the tape cassettes into and out of the tape drive 6 can be automated within the range of the data library housed in the turn table 2. However, when a number of tape cassettes 1 which are housed in the limited space as the tape library are needed, a magazine type cassette library apparatus shown in FIG. 12 is said to be more suitable than a turn table type cassette library apparatus like this.

Figure 12:
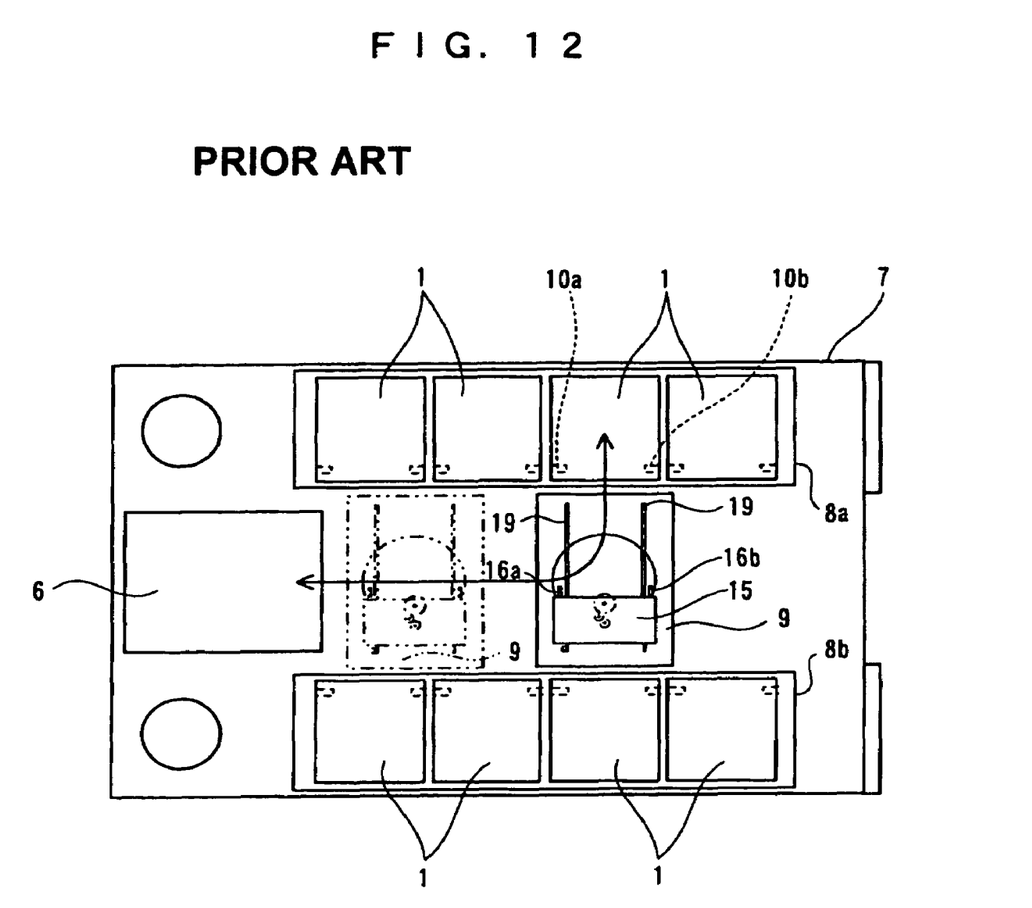
FIG. 12 is a schematic view of another known cassette library apparatus.

In this magazine type cassette library apparatus, the tape drive 6 and a set of magazine type garages 8a and 8b are disposed inside a casing 7 as shown in FIG. 12. A plurality of tape cassettes 1 are housed in each of the garages 8a and 8b in the state in which they are aligned in a row. A picker 9 disposed between the set of garages 8a and 8b transfers the tape cassette 1 from and to these garages 8a and 8b, and the tape drive 6.

Figure 13:
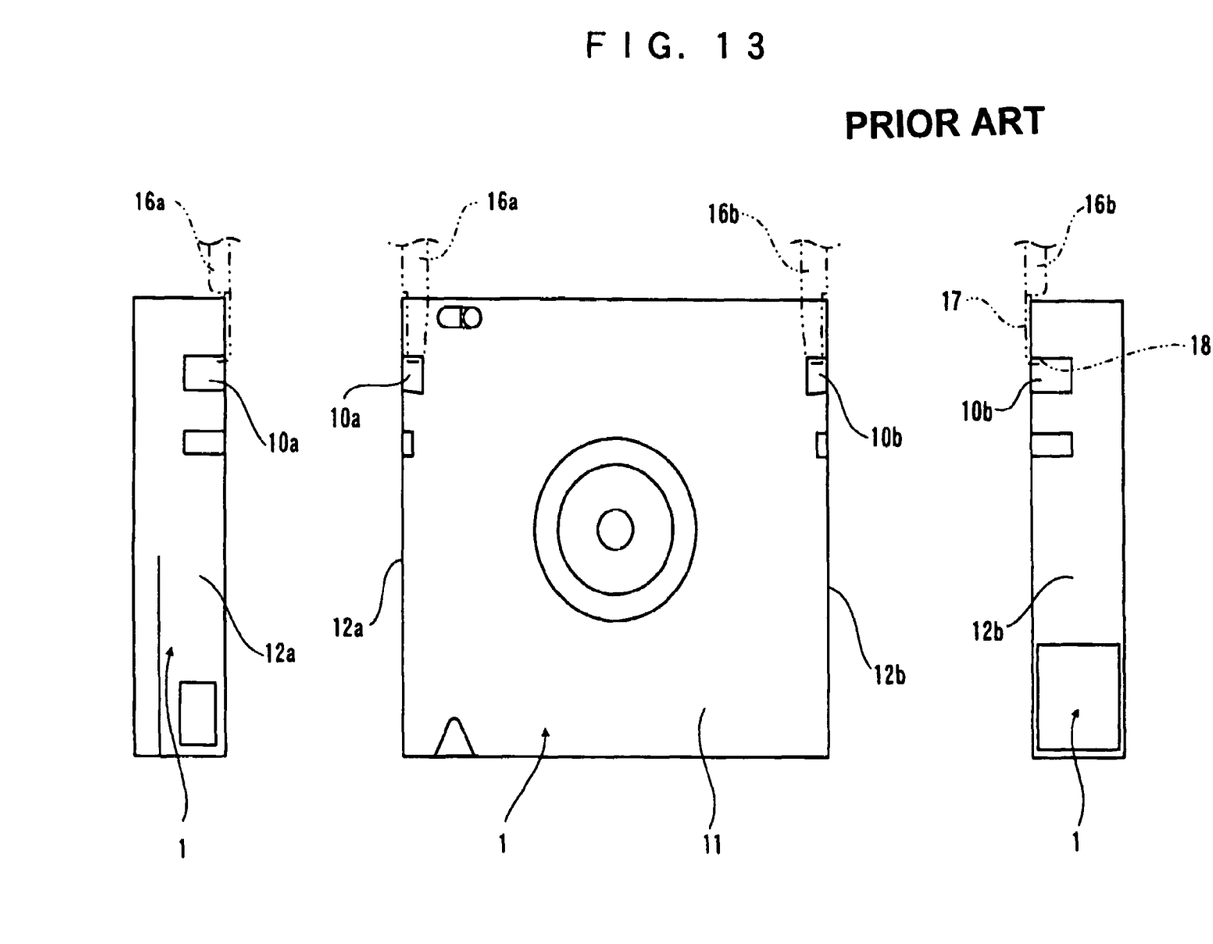
FIG. 13 is a schematic view of a tape cassette in the apparatus in FIG. 12.
Figure 14:
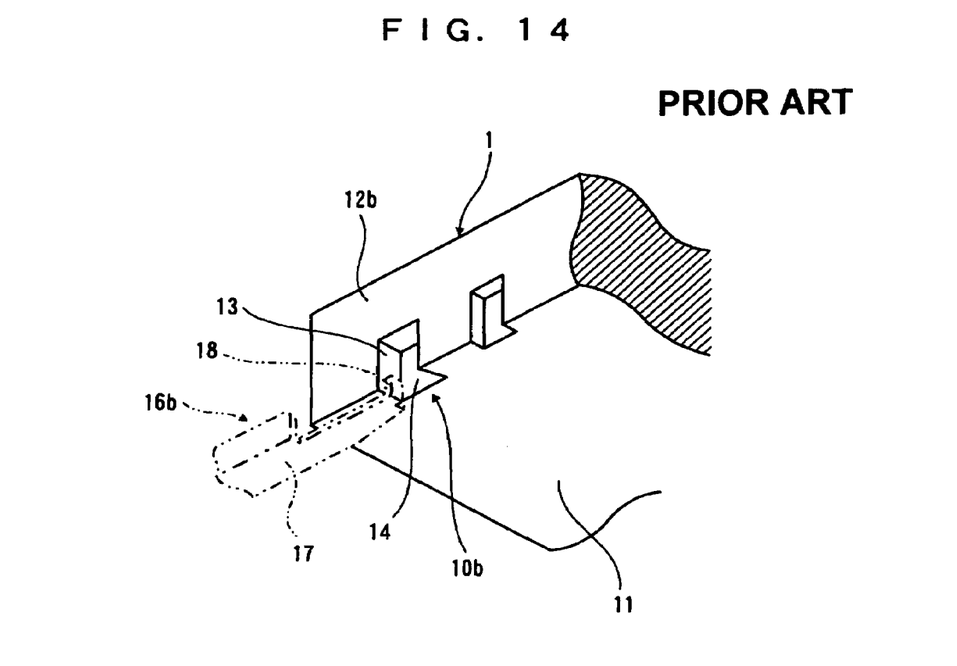
FIG. 14 is a perspective view of an essential part of the tape cassette in FIG. 13.

FIG. 13 shows a construction of one example of the tape cassette 1. This tape cassette 1 is formed into a thin rectangular parallelepiped shape as shown in the drawing, and recessed parts 10a and 10b are respectively formed at both side portions of its bottom side. Reference numeral 11 denotes a bottom surface of the tape cassette 1, and reference numerals 12a and 12b denote its side surfaces. As shown in FIGS. 12 to 14, the tape cassette 1 is housed in the garages 8a and 8b so that its recessed parts 10a and 10b are located at open sides of the garages 8a and 8b, namely, the sides near to the picker 9. Each of the recessed parts 10a and 10b has a side wall surface 13 which is formed at the open sides of the garages 8a and 8b, namely, the positions near to the picker 9, and a bottom surface 14.

Figure 15:
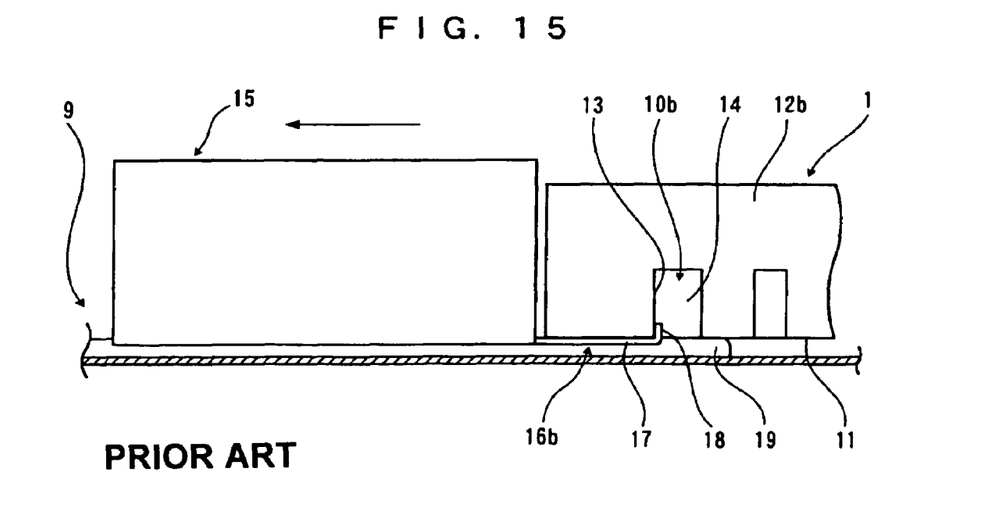
FIG. 15 is a view showing a state in which the tape cassette in FIGS. 13 and 14 is drawn out by a picker.

As shown in FIGS. 12 and 15, the picker 9 includes a movable body 15 movable in the horizontal direction. The movable body 15 has a set of swing arms 16a and 16b as shown in FIGS. 12 to 15, and the swing arms 16a and 16b are swingable in an up-and-down direction. Each of the swing arms 16a and 16b has a main body 17 in the horizontal direction and a raised part 18 raised upward from a tip end of the main body 17.

The swing arms 16a and 16b swing upward in the state in which the movable body 15 of the picker 9 approaches the tape cassette 1 housed in the garages 8a and 8b as shown in FIG. 15, and thereby, the main bodies 17 contact the bottom surface 11 of the tape cassette 1, and the raised parts 18 get into the recessed parts 10a and 10b as shown in the drawing. At this time, the raised parts 18 of a set of the swing arms 16a and 16b restrict the positions of the side wall surfaces 13 of the recessed parts 10a and 10b. From the above, the tape cassette 1 is chucked by the swing arms 16a and 16b. In this state, the movable body 15 moves in the direction to be away from the garages 8a and 8b, whereby the raised parts 18 of the swing arms 16a and 16b abut on the side wall surfaces 13 of the recessed parts 10a and 10b, and the tape cassette 1 can be drawn out of the garages 8a and 8b.

As shown in FIGS. 12 and 15, the picker 9 has a guide rail 19, and the tape cassette 1 which is drawn out is placed on this guide rail 19. Thereby, transfer of the tape cassette 1 from the garages 8a and 8b to the picker 9 is completed.

In order to accurately perform chucking and unchucking of the tape cassette 1 by swing of the swing arms 16a and 16b, the postures of the swing arms 16a and 16b need to be detected in real time.

Therefore, in the prior art, the postures of the swing arms 16a and 16b are detected by sensing several important points in the swing mechanism of the swing arms 16a and 16b. Alternatively, the postures are detected by sensing torque of a motor for driving the swing mechanism of the swing arms 16a and 16b.

DISCLOSURE OF THE INVENTION

However, in the posture detecting method of the swing arms in the prior art as described above, it is necessary to dispose sensors for sensing the several important points. Therefore, the number of components increases, and with the increase in the number of components, it is difficult to make the apparatus compact. In the case of detection by the motor torque, special torque detecting unit is necessary.

Therefore, it is an object of the present invention to solve the above problem and to make it possible to easily detect the postures of swing arms for cassette chuck in a picker of a cassette library apparatus.

In order to achieve this object, a cassette library apparatus of the present invention includes a picker for drawing out a cassette from a garage and pushing the cassette into the garage, the cassette being housed in the garage and having a recessed part at a bottom portion, wherein the picker comprises a swing frame provided at the picker to be swingable up and down, a swing arm provided at the swing frame and swingable integrally with the swing frame, an engaging part provided at a tip end of the swing arm and linked to an upward swing motion of the swing arm to be able to get into the recessed part of the cassette from below, a swing mechanism for swinging the swing frame and the swing arm, a stepping motor for driving the swing mechanism, a first detector for detecting the swing arm being in a specific posture when the swing arm is in a specific posture, and a second detector for detecting the posture of the swing arm by counting a number of pulses supplied to the stepping motor when the posture of the swing arm changes from the specific posture by drive of the stepping motor.

a picker for drawing a cassette housed in a garage and having a recessed part at a bottom portion from the garage and pushing the cassette into the garage, wherein the picker includes a swing frame provided at the picker to be swingable up and down, a swing arm provided at the swing frame and swingable integrally with the swing frame, an engaging part provided at a tip end of the swing arm and linked to upward swing movement of the swing arm to be able to get into the recessed part of the cassette from below, a swing mechanism for swinging the swing frame and the swing arm, a stepping motor for driving the swing mechanism, a first detector for detecting the swing arm being in a specific posture when the swing arm is in the specific posture, and a second detector for detecting the posture of the swing arm by counting a number of pulses supplied to the stepping motor when the posture of the swing arm changes from the specific posture by drive of the stepping motor.

A method for controlling a posture of a cassette library apparatus including a picker for drawing out a cassette from a garage and pushing the cassette into the garage, the cassette being housed in the garage and having a recessed part at a bottom portion, the picker comprising a swing frame provided at the picker to be swingable up and down, a swing arm provided at the swing frame and swingable integrally with the swing frame, and an engaging part provided at a tip end of the swing arm and linked to an upward swing motion of the swing arm to be able to get into the recessed part of the cassette from below, wherein the method comprises driving a swing mechanism for swinging the swing frame and the swing arm by a stepping motor, detecting the swing arm being in a specific posture when the swing arm is in the specific posture and detecting the posture of the swing arm by counting a number of pulses supplied to the stepping motor when the posture of the swing arm is changed from the specific posture by the drive of the stepping motor.

Consequently, according to the present invention, by only providing the unit for detecting the swing arm being in the specific posture when the swing arm is in the specific posture, the other postures can be detected by counting the number of pulses supplied to the stepping motor which is used for driving the swing mechanism of the swing arm, and therefore, the posture of the swing arm can be detected with the simple construction.

According to the present invention, when the swing arm is detected being in the specific posture by the photointerrupter and the slit plate.

Accordingly, the swing arm can be detected being in the specific posture easily and reliably.

According to the present invention, in the above described apparatus or method, every time the swing arm is detected being in the specific posture, counting of the number of pulses is reset.

Accordingly, the number of pulses is reset with the point of the time when the swing arm is in the specific posture as an origin, and therefore, control can be performed by always detecting the posture of the swing arm with high accuracy.

According to the present invention, by only providing the step for detecting the swing arm being in the specific posture when the swing arm is in the specific posture, the other postures can be detected by counting the number of pulses supplied to the stepping motor which is used for driving the swing mechanism of the swing arm, and therefore, the posture of the swing arm can be detected with the simple construction.

BEST MODE FOR CARRYING OUT THE INVENTION

Figure 8:
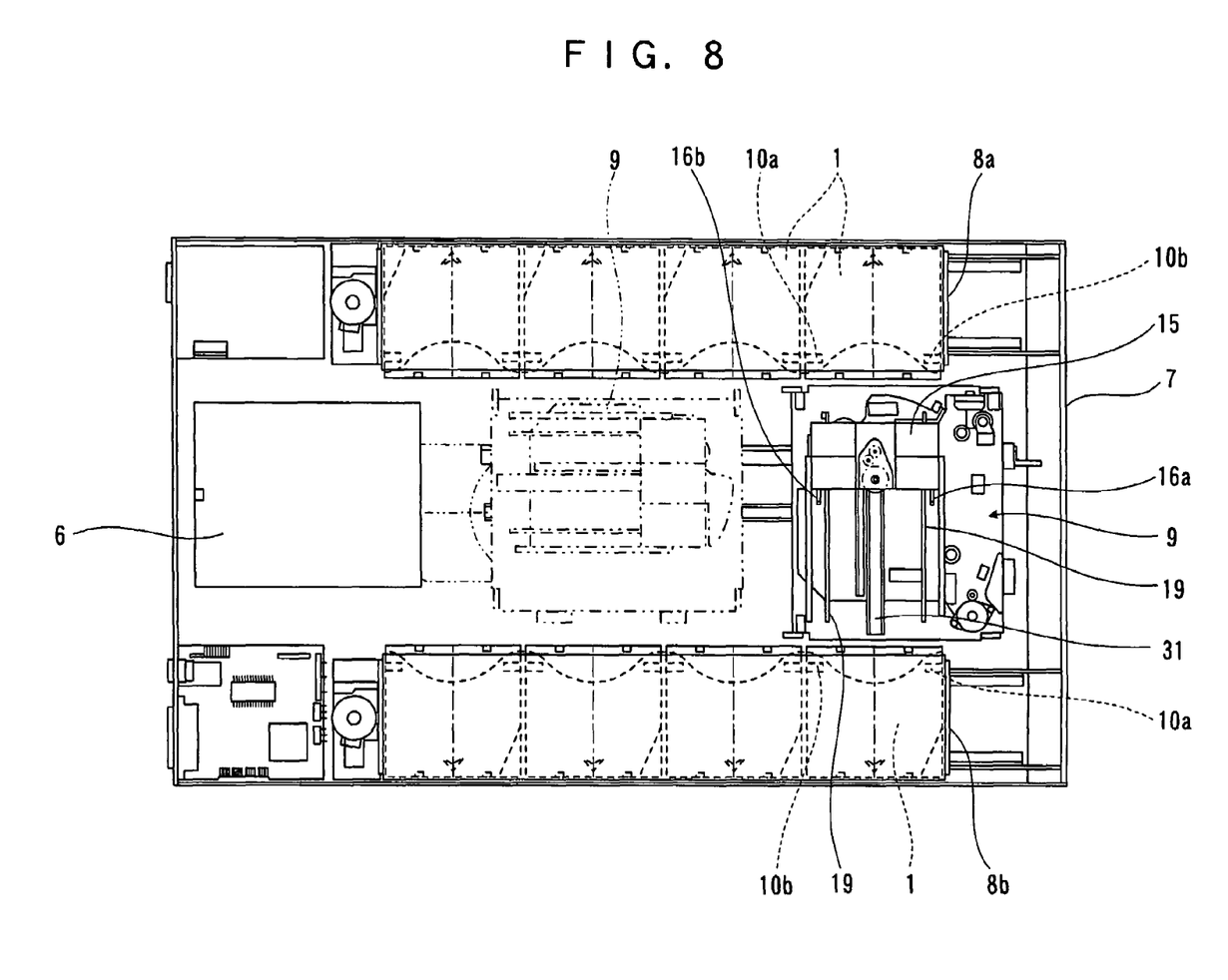
FIG. 8 is a plane view of the entire cassette library apparatus.

FIG. 8 shows a plane view of an embodiment of a cassette library apparatus of the present invention. this apparatus is of the same magazine type as that of the known cassette library apparatus shown in FIG. 12, and includes a casing 7, garages or housings 8a and 8b, a picker 9, and a tape drive 6. The tape cassettes 1 are housed in the garages 8a and 8b each in a posture in which recessed parts 10a and 10b are located at open sides of the garages 8a and 8b, namely, the positions near a picker 9.

The picker 9 has a movable body 15 capable of moving in the horizontal direction and coming closer to and going away from the garages 8a and 8b and the tape drive 6, a guide rail 31 for guiding the movement of the movable body 15, and another guide rail 19 which is provided at a higher position than the guide rail 31, and thereby guides the tape cassette 1 with the tape cassette 1 drawn out on the picker 9 placed on the guide rail 19. The guide rail 31, the guide rail 19 and the movable body 15 are constructed to be rotatable in the horizontal direction inside the picker 9, and thereby the posture, namely the orientation in the horizontal direction of the tape cassette 1 can be changed.

FIGS. 2 to 7 show a detailed structure of the movable body 15. This movable body 15 has a plate-shaped lower side stationary frame 32, a plate-shaped upper side stationary frame 33, and a plate-shaped swing frame 34 provided between these stationary frames 32 and 33. For details, a frame-shaped structure 36 is constructed by fixing and integrating the stationary frames 32 and 33 by a fastening element 35 to each other, and this structure 36 forms a framework of the movable body 15. Bearings 38 having U-shaped grooves 37 facing upward are respectively formed at both end portions of the lower side stationary frame 32 along the direction perpendicular to a moving direction of the movable body 15. Bearings 40 having U-shaped grooves 39 facing downward are respectively formed at both end portions of the upper side stationary frame 33 along the direction perpendicular to the moving direction of the movable body 15. The swing frame 34 has the shafts 41 in the horizontal direction at both end portions respectively, and these shafts 41 are supported by the bearings 38 and 40, whereby the swing frame 34 is made swingable around the horizontal axis in the perpendicular direction to the moving direction of the movable body 15. Both end portions of the swing frame 34 along the moving direction of the movable body 15 are formed to be bent downward respectively, and thereby, form stoppers 42 capable of abutting against the lower stationary frame 32. The swing range of the swing frame 34 is restricted by the stoppers 42.

A set of swing arms 16a and 16b are integrally formed at both end portions of the swing frame 34 along the perpendicular direction to the moving direction of the movable body 15. These swing arms 16a and 16b have main bodies 17 which project horizontally in the moving direction of the movable body 15 from the structure 36, and raised parts 18 as engaging parts which are integrally formed at tip ends of the main bodies 17.

A set of swing arms 16a and 16b are basically formed at one side along the moving direction of the movable body 15 from the movable body 15 as shown by the solid line in the drawing. However, as shown by the solid line and the phantom line in FIG. 4, sets of swings arms 16a and 16b can be respectively formed at both sides along the moving direction of the movable body 15.

A swing mechanism of the swing frame 34 will be explained. Inside the structure 36, a stepping motor 45 is mounted to the upper side stationary frame 33, and a gear mechanism 46 linked to a drive shaft of the motor 45 is provided at a position on the upper surface of the upper side stationary frame 33. A screw shaft 47 in the up-and-down direction as a feed screw which is provided inside the structure 36 and is rotationally driven by the motor 45 via the gear mechanism 46 is linked and connected to the gear mechanism 46. The screw shaft 47 is supported by a bearing 49 which is disposed inside the structure 36 and mounted to the upper stationary frame 33, in an upper portion of the screw shaft 47. A nut-shaped body 48 is mounted to the swing frame 34 in the loose state having a play. The screw shaft 47 and the nut-shaped body 48 are screwed onto each other.

Due to such a construction of the swing mechanism, the screw shaft 47 is rotated by the motor 45 via the gear mechanism 46, whereby, the nut-shaped body 48 screwed onto the screw shaft 47 rises and lowers, and thereby, the swing frame 34 is swung up and down within the range restricted by the stoppers 42. With the swing of the swing frame 34, the swing arms 16a and 16b are similarly swung. At this time, the nut-shaped body 48 performs linear movement up and down along the screw shaft 47, while the swing frame 34 performs a swing motion, namely, a curvilinear motion, but the play is provided between both of them as described above, and therefore, they can move without hindrance.

A photointerrupter 51 having a light projecting part and a light receiving part is mounted to the lower side stationary frame 32. Corresponding to this, a slit plate 52 which works with the photointerrupter 51 is mounted to the swing frame 34. The slit plate 52 moves between the light projecting part and the light receiving part in the photointerrupter 51 by the swing frame 34 swinging. A slit 53 which is formed in the slit plate 52 is located between the light projecting part and the light receiving part in the photointerrupter 51 when the swing frame 34 is in the horizontal posture. Namely, when the swing frame 34 and the swing arms 16a and 16b are in the horizontal posture, the photointerrupter 51 can output the signal indicating as such.

Figure 1:
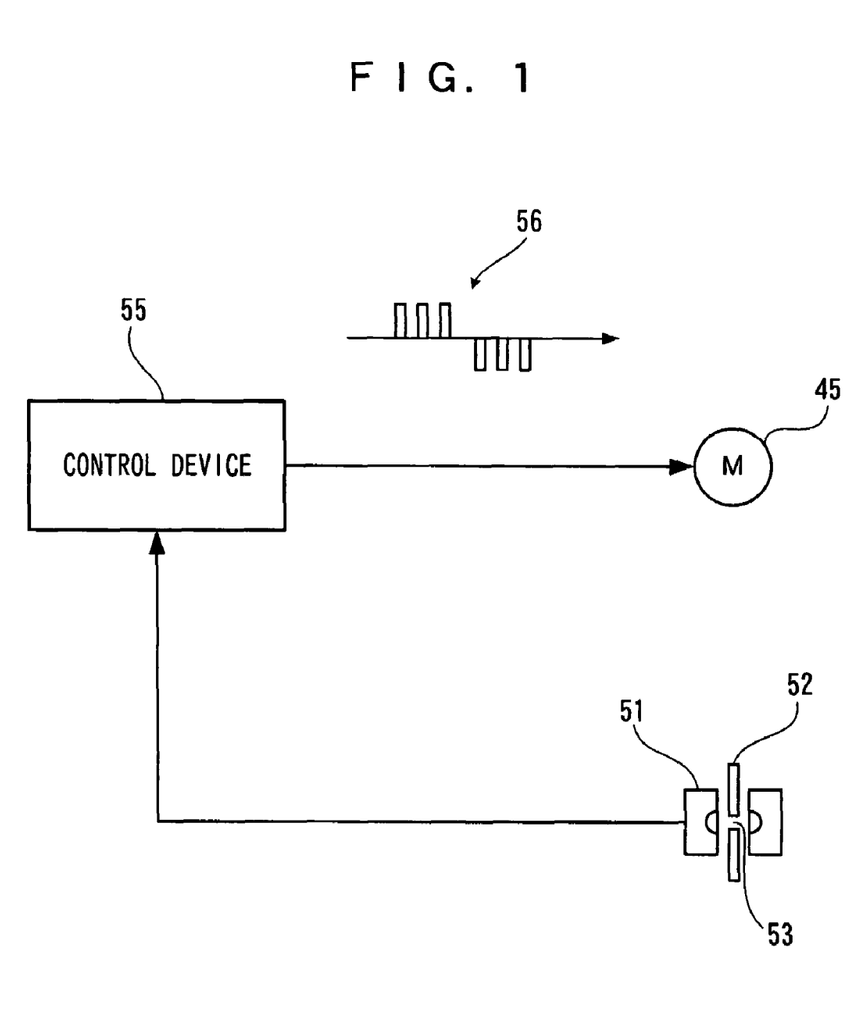
FIG. 1 is a view showing a schematic construction of an essential part of an embodiment of a cassette library apparatus of the present invention.
Figure 3:
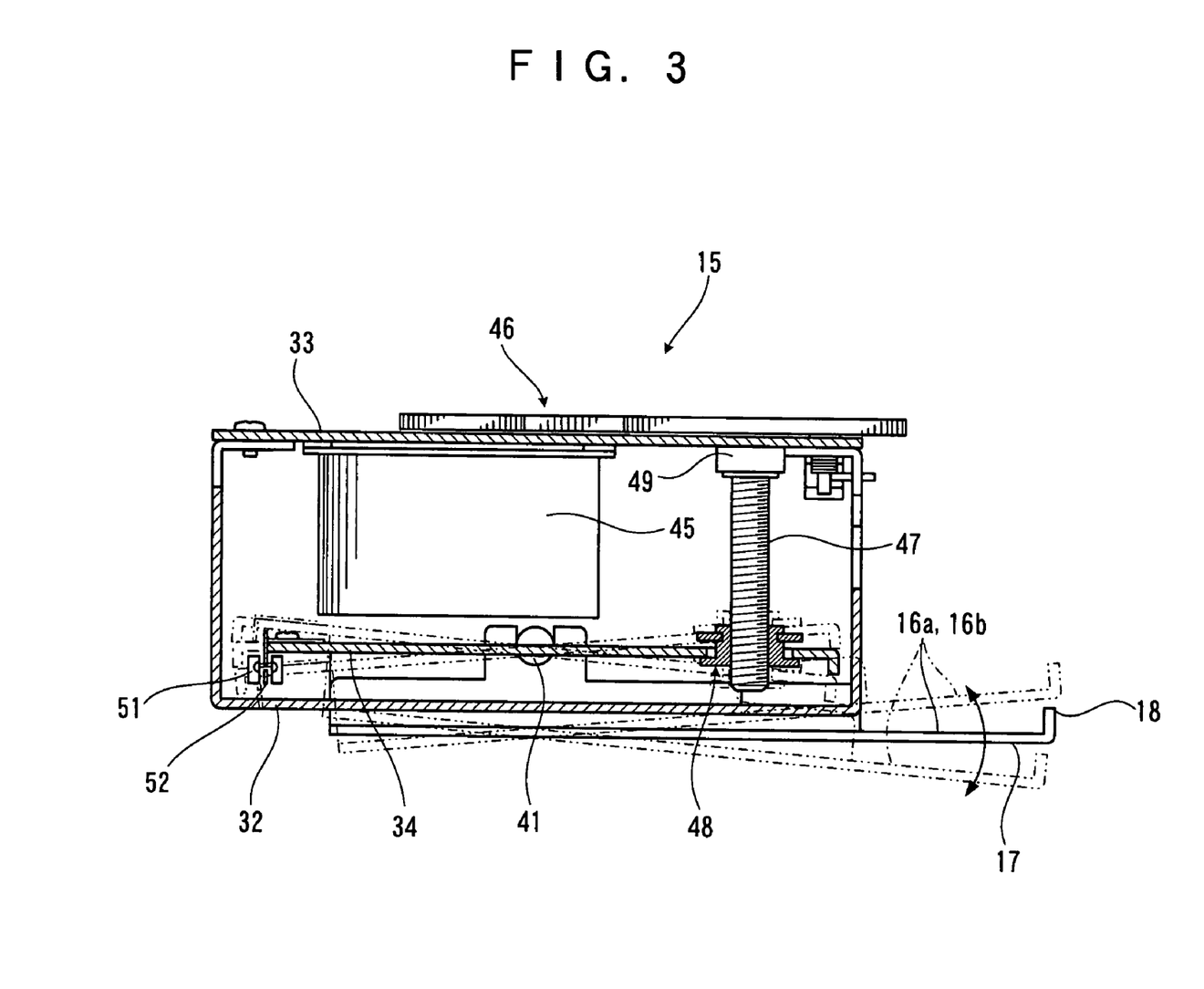
FIG. 3 is a view showing a swing arm and a posture detecting part in the same cassette library apparatus.
Figure 4:
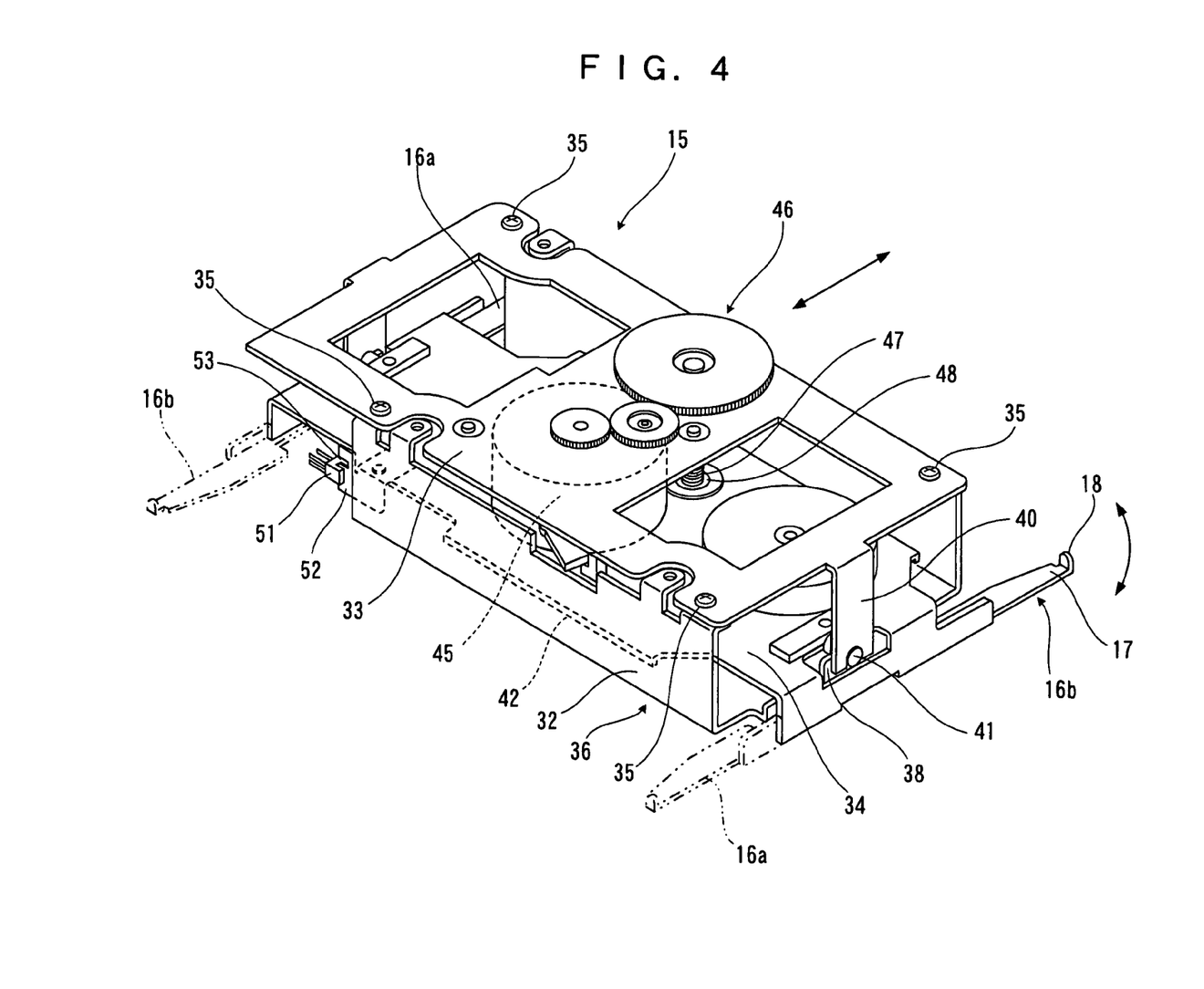
FIG. 4 is a general perspective view of the part shown in FIG. 2.
Figure 5:
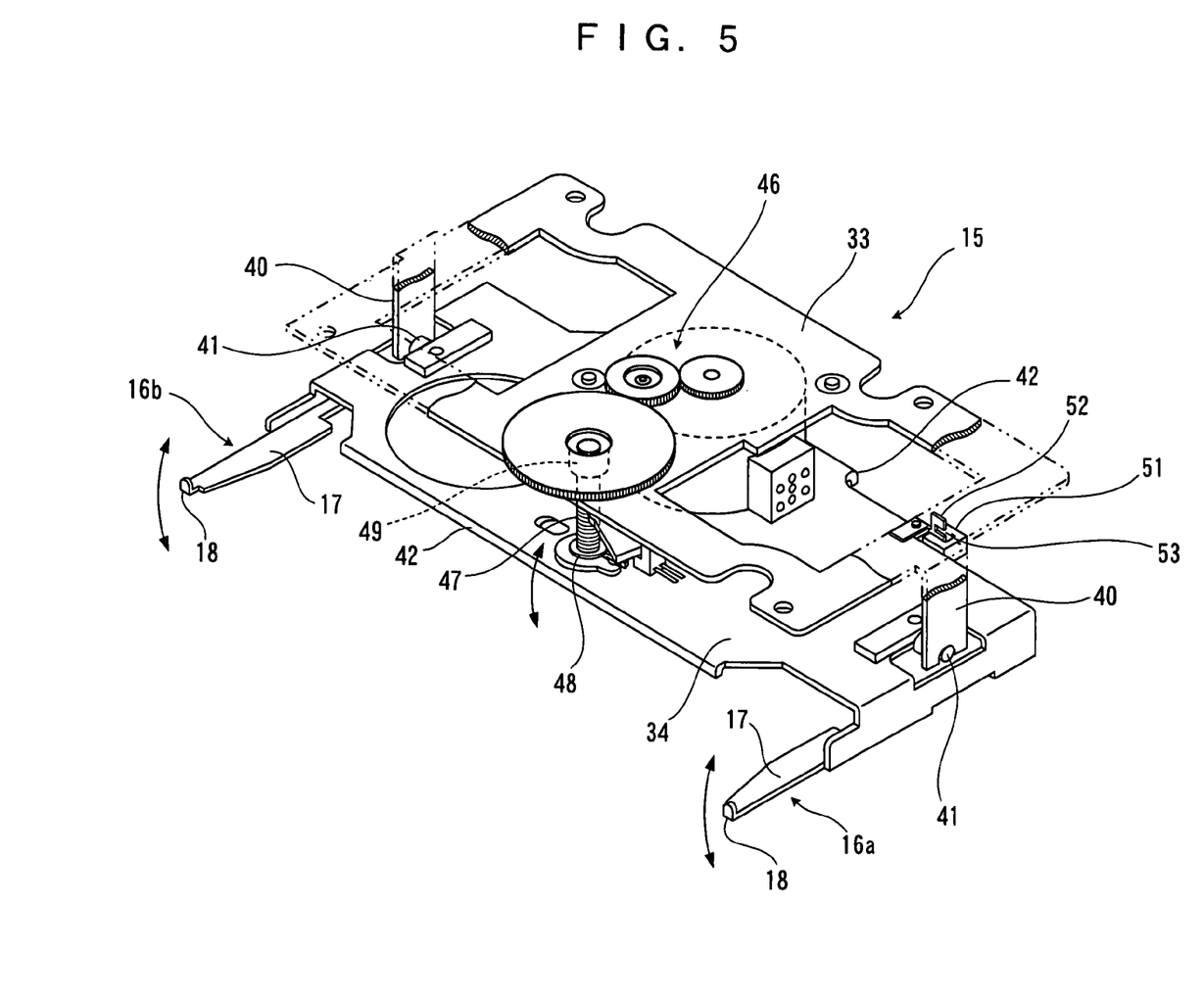
FIG. 5 is a perspective view of the part shown in FIG. 4 from another direction shown with a lower side stationary frame omitted.
Figure 6:
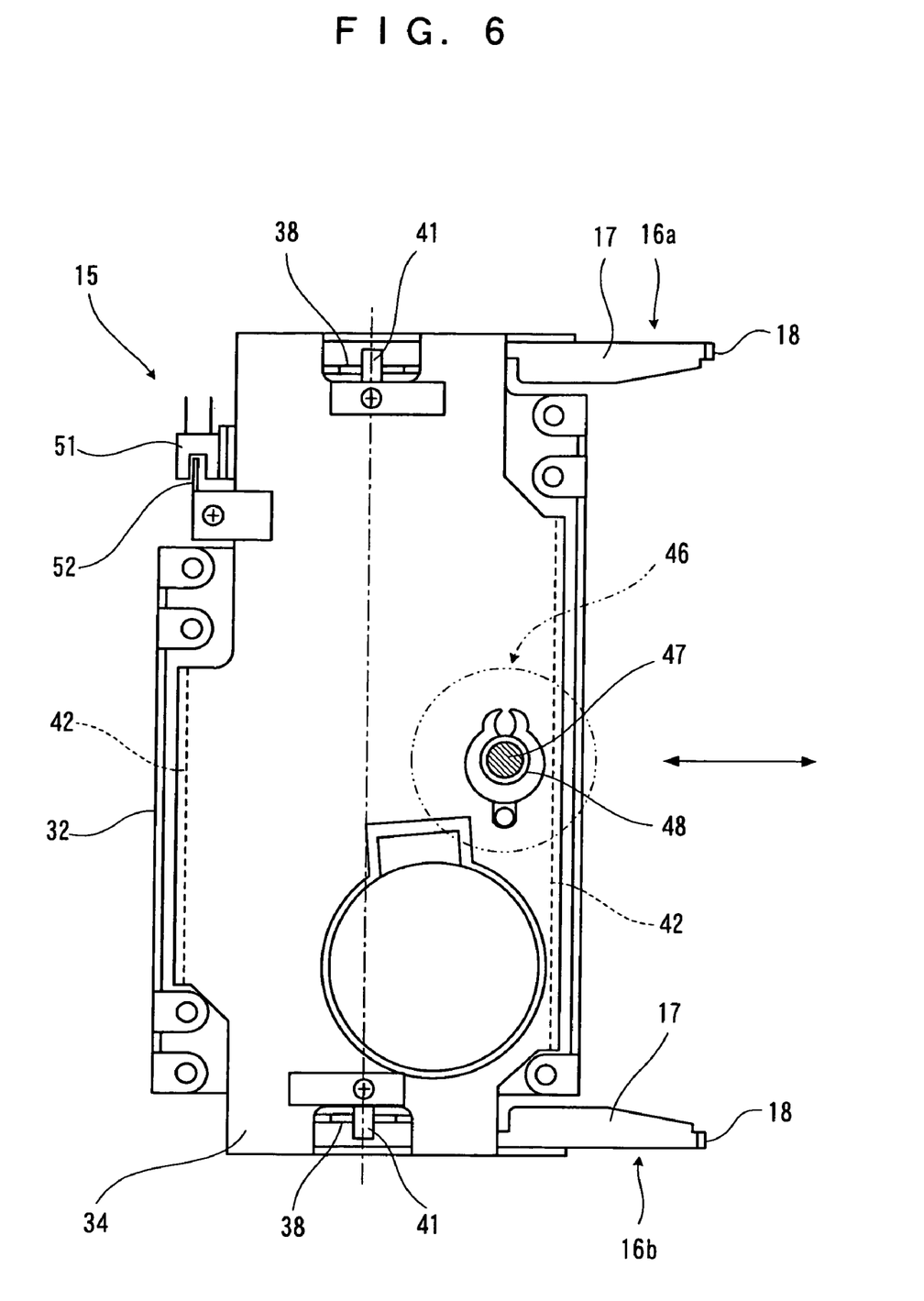
FIG. 6 is a plane view of the part shown in FIG. 4.
Figure 7:
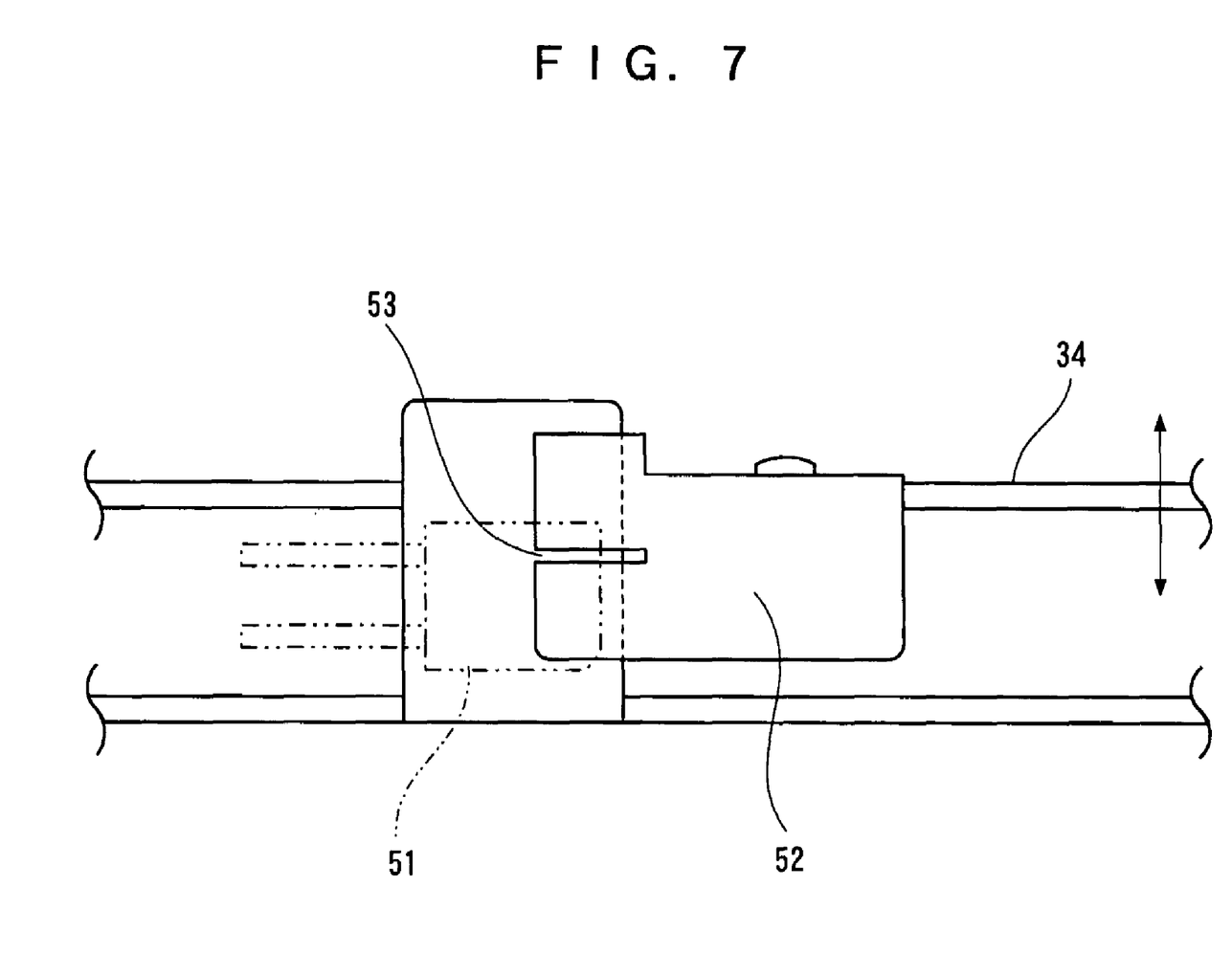
FIG. 7 is a detailed view of the posture detecting part in the same cassette library apparatus.

FIG. 1 shows a construction of a control system for the stepping motor 45 which rotates the screw shaft 47 for swinging the swing frame 34. Reference numeral 55 denotes a control device, which is capable of supplying a drive pulse 56 to the stepping motor 45 and receiving signals from the photointerrupter 51. The control device 55 is capable of detecting the swing frame 34 being in the horizontal posture by the signal from the photointerrupter 51. The control device 55 is capable of detecting to what extent the swing frame 34 swings upward or downward from the horizontal posture by counting the number of drive pulses 56 which are supplied to the stepping motor 45 after receiving the signal from the photointerrupter 51. Namely, the control device 55 is capable of detecting the postures of the swing frame 34 and the swing arms 16a and 16b as shown in FIG. 3 in real time. The control device 55 can receive the signal from the photointerrupter 51 and reset the counting of the number of drive pulse 56 every time the swing frame 34 is brought into the horizontal posture, and therefore, the control device 55 can always detect the posture of the swing arm 34 accurately with the horizontal posture as its origin.

In the above description, when the swing arm 34 is in the horizontal posture, the photointerrupter 51 detects this, and the control device 55 resets the counting of the number of drive pulses 56, but the control device 55 can reset when the swing arm is in another posture. Since the play is especially provided between the nut-shaped body 48 and the swing frame 34 as described above, an error occurs to the detection of the posture of the swing frame 34 by the amount of this play. However, this play, namely, a clearance between the nut-shaped body 48 and the swing frame 34 becomes the largest when the swing frame 34 is in the horizontal posture, and as the degree of swing of the swing frame 34 becomes larger, the play becomes gradually smaller. Thus, the mounting position of the photointerrupter 51 and the slit plate 52 is adjusted so that when the swing frame 34 tilts to the maximum limit until the stopper 42 abuts against the lower stationary frame 32, the photointerrupter 51 detects this, and thereby, the occurrence of the posture detection error due to existence of the aforementioned play can be reduced most.

In the above description, the method using the slit plate 52 on which the slit 53 is formed is explained, but by using a simple cutting off plate which does not have a slit, and utilizing the fact that an edge at one side of the cutting off plate acts on the photointerrupter 51, a specific posture of the swing frame 34 can be also detected. It is also possible to detect a specific posture of the swing frame 34 by using an optical sensor other than the photointerrupter 51, and another type of sensor.

Figure 2:
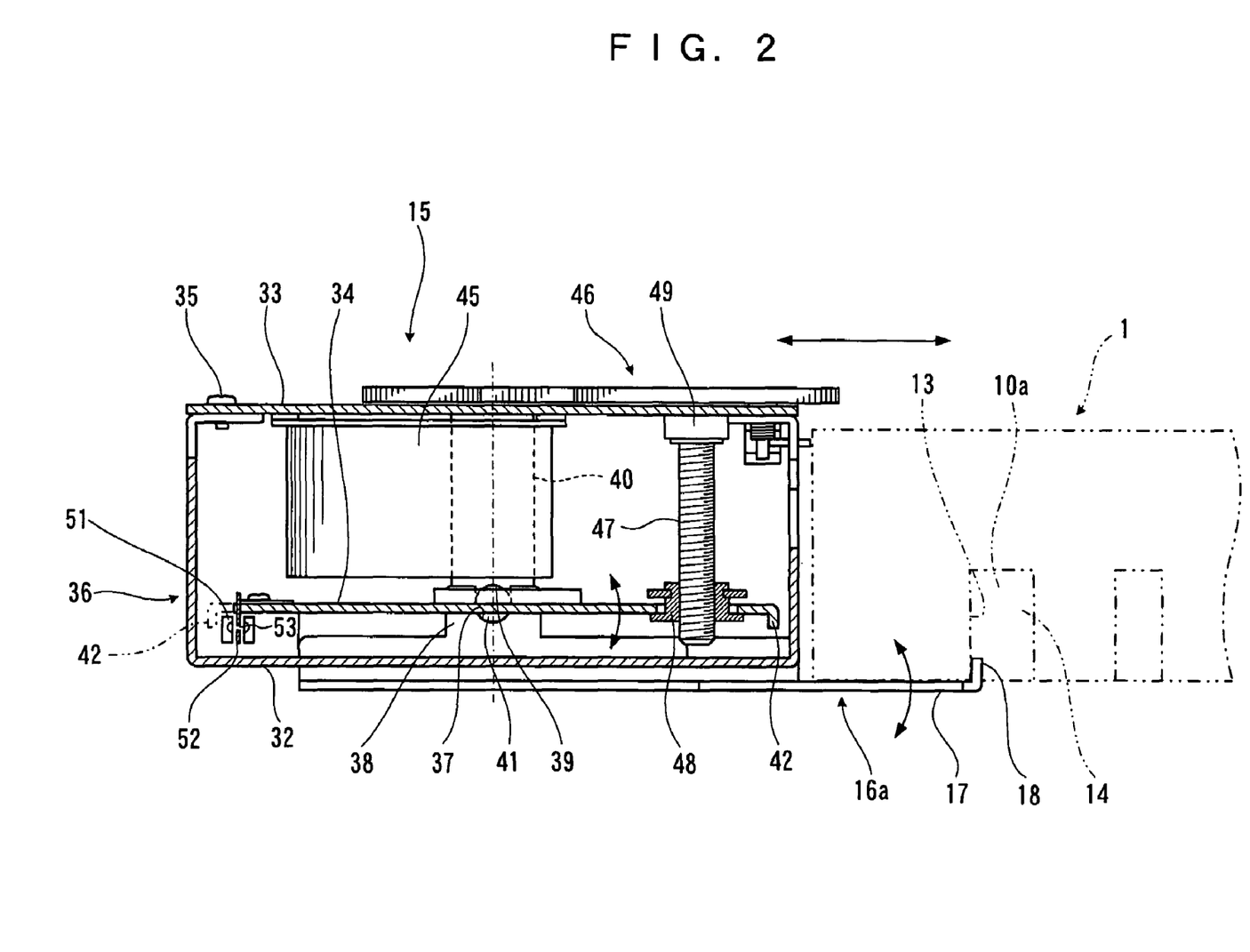
FIG. 2 is a sectional view of an essential part of the same cassette library apparatus.

When the tape cassette 1 is drawn out of the garages 8a and 8b in FIG. 8, for example, and transferred into the tape drive 6 in this construction, the swing frame 34 is swung downward while detecting the posture of the swing frame 34, and the movable body 15 is brought close to the tape cassette 1 with the swing arms 16a and 16b lowered. When the movable body 15 is close to the tape cassette 1, the nut-shaped body 48 is raised by the rotation of the screw shaft 47, and thereby, the swing frame 34 is swung upward, whereby the swing arms 16a and 16b are raised, and the raised parts 18 are allowed to get into the recessed parts 10a and 10b of the tape cassette 1. FIG. 2 shows the state at this time, where the tape cassette 1 is chucked by the swing arms 16a and 16b when the swing frame 34, namely, the swing arms 16a and 16b are in the horizontal posture. Thereby, when the control device 55 detects the swing frame 48 being in the horizontal posture via the photointerrupter 51 in the state in which the movable body 51 is close to the tape cassette 1, the control device 55 can detect the tape cassette 1 being chucked by the swing arms 16a and 16b at the same time.

When the movable body 15 is moved in the direction to be away from the garages 8a and 8b, the tape cassette 1 is drawn out of the garages 8a and 8b and is housed in the picker 9. Thereupon, the tape cassette 1 is carried by the picker 9 and is transferred into the tape drive 6.

The apparatus functions in the same manner when the tape cassettes 1 are pushed into the garages 8a and 8b, and it also functions in the same manner when the tape cassette 1 is pushed into the tape drive 6 and the tape cassette 1 is drawn out of the tape drive 6.

Figure 9:
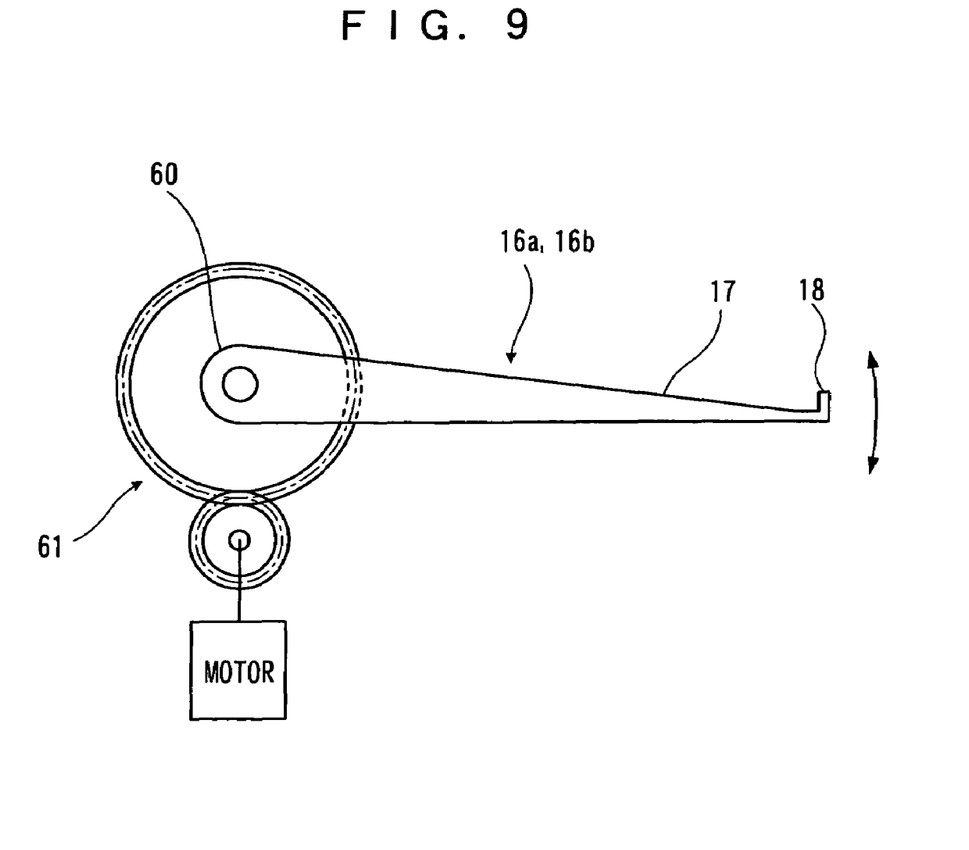
FIG. 9 is a view showing another example of a drive mechanism of the swing arm.
Figure 10:
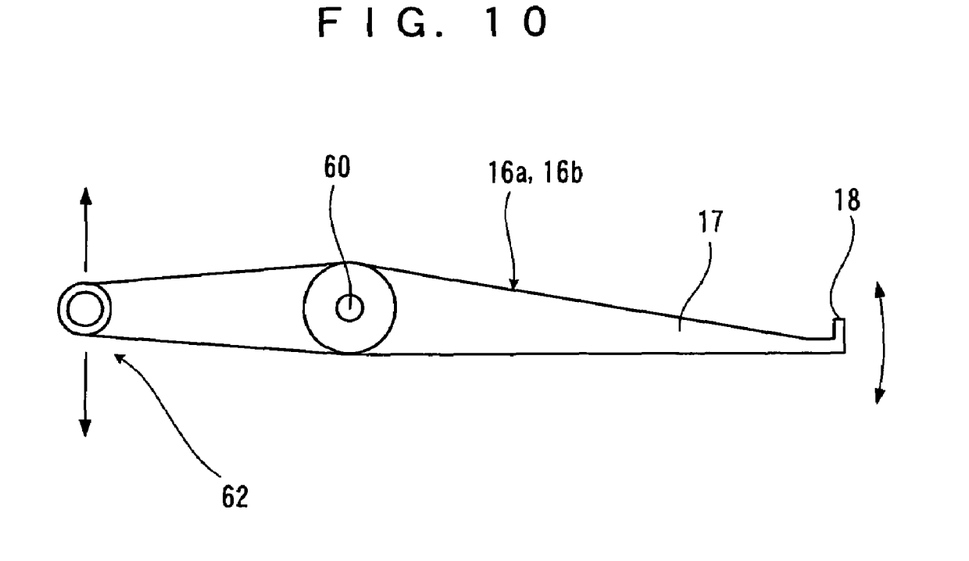
FIG. 10 is a view showing still another example of the drive mechanism of the swing arm.

In the above description, as the swing mechanism of the swing arm, the mechanism using the screw shaft 47 and the nut-shaped body 48 is explained, but as the drive mechanism for this, other optional drive mechanisms can be used. For example, in the drive mechanism in FIG. 9, the swing arms 16a and 16b are constructed to turn around a support point 60 and swing in the up and down direction, and the swing motion is performed by a drive motor via a gear mechanism 61. FIG. 10 shows still another example of the swing mechanism. Here, swing of the swing arms 16a and 16b around the support point 60 is performed by a link mechanism 62 which is driven by a motor not shown. In these mechanisms, or in the other mechanisms, the postures of the swing arms 16a and 16b can be similarly detected.

INDUSTRIAL APPLICATION

In the cassette library apparatus and a posture control method thereof of the present invention, by only providing the unit for detecting the swing arm being in the specific posture, the other postures can be detected by counting the number of pulses supplied to the stepping motor which is used for driving the swing mechanism of the swing arms, and thus the postures of the swing arms can be detected with the simple construction. Therefore, the cassette library apparatus and the posture control method thereof of the present invention are useful as the cassette library apparatus or the like in which a cassette such as a tape cassette housed in the garage is drawn out by the picker of the turn table structure and the cassette is transferred to the driver for performing recording and reproduction for a medium in this cassette, and a posture control method thereof.

The invention claimed is:

1. A cassette library apparatus, comprising:
    a picker for withdrawing a cassette from a housing and pushing such cassette into such housing, such a cassette having a recess on a bottom portion of the cassette;
    wherein the picker comprises:
    a swing frame swingable up and down about an axis,
    a swing arm connected to the swing frame and swingable integrally with the swing frame,
    an engaging part located at a tip end of the swing arm for engaging a recess of such a cassette to chuck such cassette when the swing arm is swung upward to a specific posture,
    a swing mechanism for swinging the swing frame and the swing arm,
    a stepping motor for driving the swing mechanism,
    a detector for detecting when the swing arm is in the specific posture and such cassette is chucked by the swing arm, and for detecting when the swing arm is in at least a second posture by counting a number of pulses to be supplied to the stepping motor when the swing arm deviates from the specific posture as driven by the stepping motor.

2. The cassette library apparatus according to claim 1, wherein the detector comprises a photointerrupter and a slit plate.

3. The cassette library apparatus according to claim 1, wherein when the detector detects that the swing arm is in the specific posture, the detector restarts counting the number of pulses.

4. A method for controlling a posture of a cassette library apparatus comprising a picker for withdrawing a cassette from a housing and pushing the cassette into such housing, such a cassette having a recess on a bottom surface thereof, the picker comprising:
    a swing frame swingable up and down about an axis,
    a swing arm connected to the swing frame and swingable integrally with the swing frame, and
    an engaging part located at a tip end of the swing arm for engaging a recess of such a cassette to chuck such cassette when the swing arm is swung upward to a specific posture, said method comprising:
        driving a stepping motor, thereby activating a swing mechanism for swinging the swing frame and the swing arm;
        detecting when the swing arm is in the specific posture and such cassette is chucked by the swing arm; and
        detecting at least a second posture of the swing arm by counting a number of pulses to be supplied to the stepping motor when the swing arm deviates from the specific posture as driven by the stepping motor.

5. The method for controlling a posture of a cassette library apparatus according to claim 4, wherein the specific posture of the swing arm is detected by a photointerrupter and a slit plate.

6. The method for controlling a posture of a cassette library apparatus according to claim 4, further comprising restarting counting the number of pulses when the swing arm is detected to be in the specific posture.

* * * * *